Oct. 27, 1925.
A. E. SCHEIN
1,558,567
AIRCRAFT LANDING PLATFORM
Filed Sept. 27, 1922    3 Sheets-Sheet 1
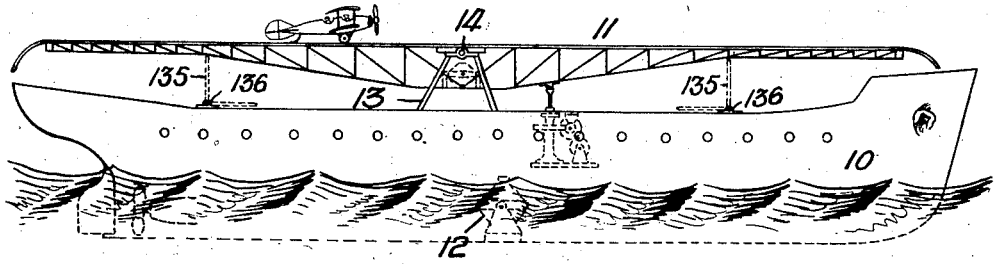
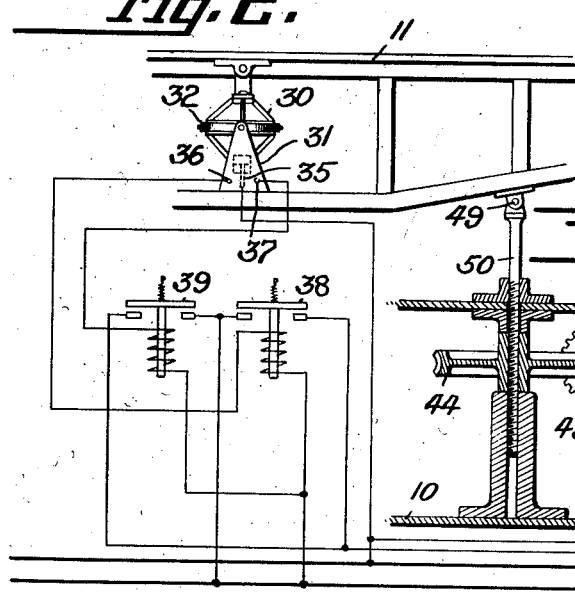
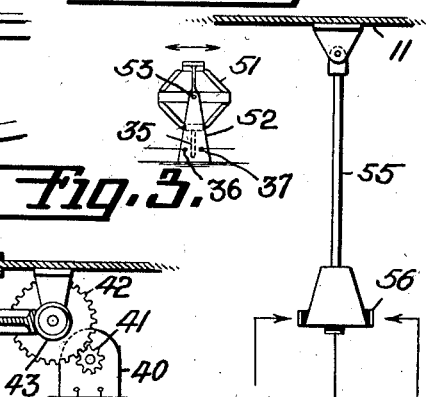
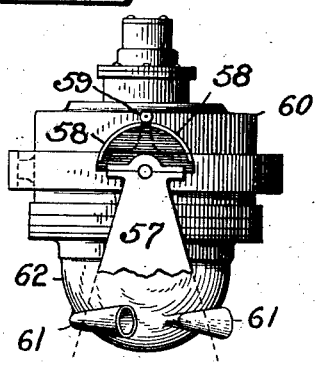
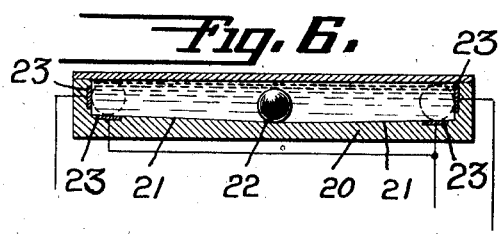
Inventor
ALEXANDER E. SCHEIN
By his Attorney
Herbert H. Thompson Oct. 27, 1925.  
A. E. SCHEIN  
1,558,567  
AIRCRAFT LANDING PLATFORM  
Filed Sept. 27, 1922  
3 Sheets-Sheet 2
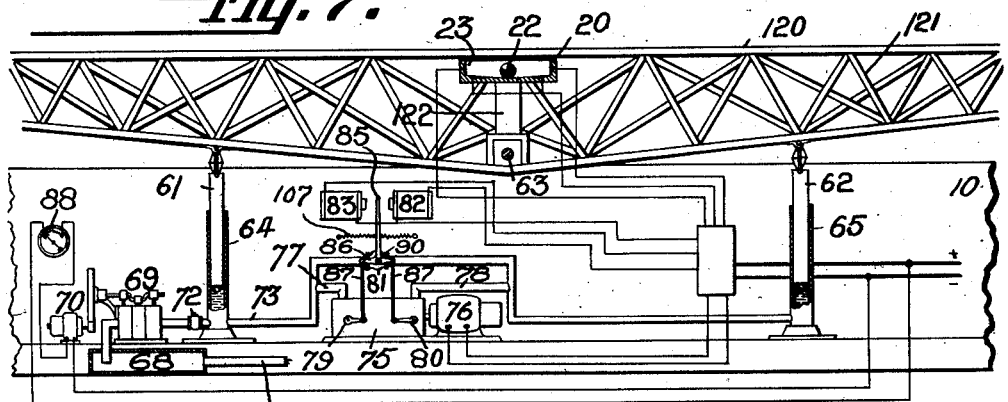
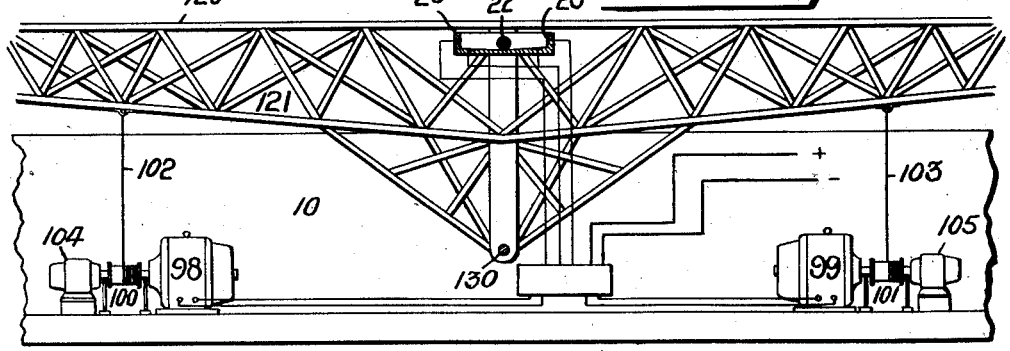
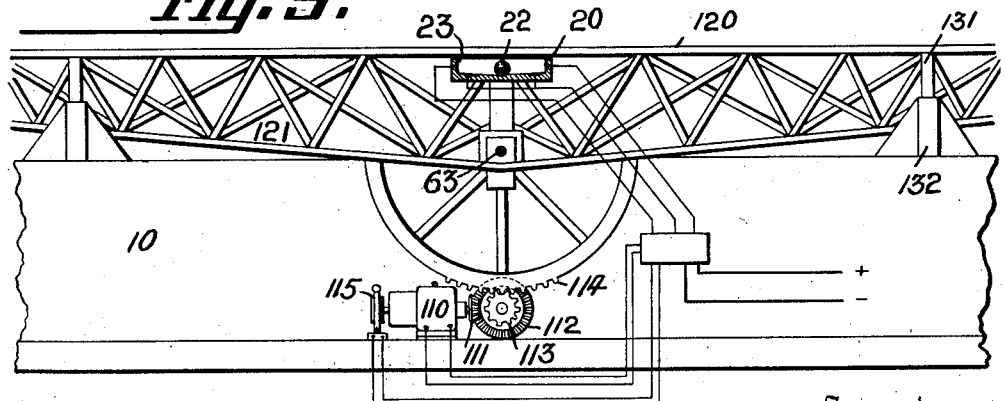
Inventor  
ALEXANDER E. SCHEIN  
By his Attorney  
Herbert H. Thompson Oct. 27, 1925.
A. E. SCHEIN
1,558,567
AIRCRAFT LANDING PLATFORM
Filed Sept. 27, 1922        3 Sheets-Sheet 3
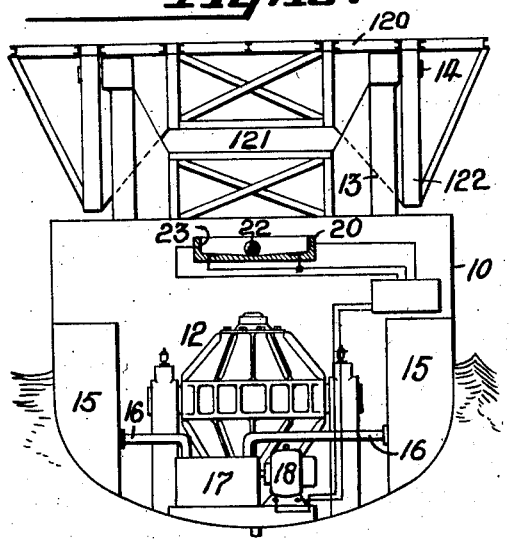
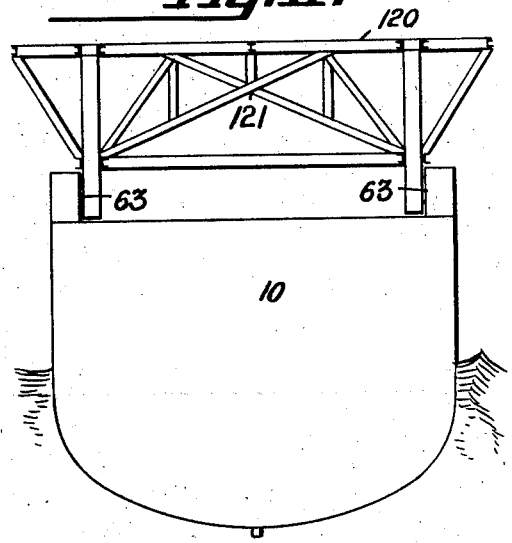
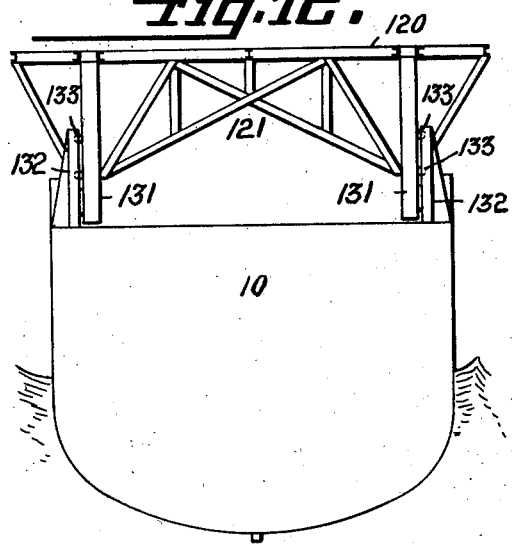
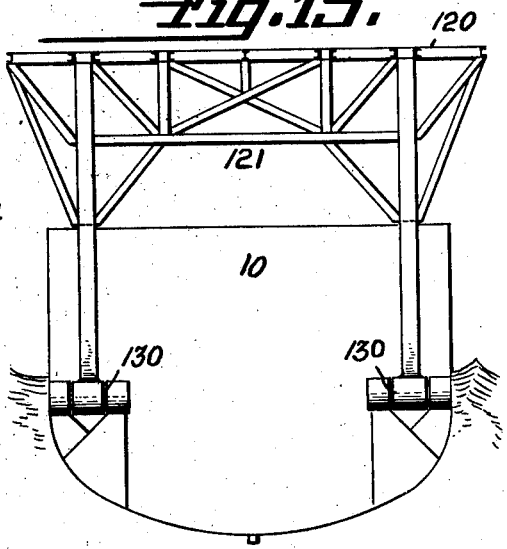
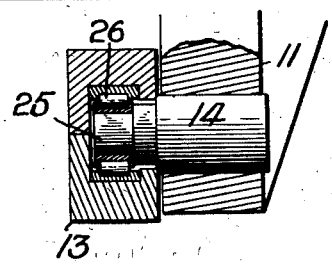
Inventor
ALEXANDER E. SCHEIN
By his Attorney
Herbert H. Thompson Patented Oct. 27, 1925.

1,558,567

UNITED STATES PATENT OFFICE.

ALEXANDER E. SCHEIN, OF NEW YORK, N. Y., ASSIGNOR TO THE SPERRY GYROSCOPE COMPANY, OF BROOKLYN, NEW YORK, A CORPORATION OF NEW YORK.

AIRCRAFT LANDING PLATFORM.

Application filed September 27, 1922. Serial No. 590,750.

*To all whom it may concern:*

Be it known that I, ALEXANDER E. SCHEIN, a citizen of the United States of America, residing at New York city, N. Y., in the county of New York and State of New York, have invented certain new and useful Improvements in Aircraft Landing Platforms, of which the following is a specification.

This invention relates to landing platforms for aircraft and, more particularly, to platforms adapted to be mounted on ships. It is desirable for the safe and efficient landing of aircraft that the platform maintain a substantially horizontal plane at all times, for otherwise, there would be danger of the aircraft striking the edge of the platform, especially since it is desirable to land at a very acute angle. This invention has for its principal object the provision of means for maintaining the horizontality of a landing or launching platform mounted on a ship, regardless of rolling or pitching movements of the latter. To prevent the platform from being affected by the rolling movements of the vessel, it may be mounted to partake of the rolling movements of the vessel and the latter stabilized against rolling, or the platform may be mounted for independent rolling movement relative to the vessel and said platform per se stabilized against rolling. Where the ship is stabilized, this invention provides means for counteracting the tendency of the vessel to establish a definite list due to some continuously impressed force such as wind, unequal loading, etc.

To prevent the platform from being affected by the pitching movements of the vessel it may be mounted upon the ship so as to be movable relative thereto, and means may be provided whereby upon incipient pitching of the platform, forces are introduced which are equal and opposite to the pitch-producing forces, and thus the horizontality of the longitudinal axis of the platform is maintained. The platform may be mounted on the ship to partake of the pitching movements thereof, or it may be pivotally balanced upon an athwartship axis in substantially frictionless bearings so that the inertia of the platform will permit the ship to pitch without carrying said platform therewith. In the latter case the balance of the platform about said axis will be destroyed when an aircraft lands upon the platform at a distance from said axis or when it becomes necessary for mechanics or other persons to mount the platform. The means provided by this invention for preventing pitch will operate in the same manner regardless of the causes which tend to produce said pitching.

Other objects and advantages will be in part obvious and in part specifically referred to in the specification.

In the accompanying drawings,

Fig. 1 is a side elevation of a ship provided with an aircraft platform and illustrating one embodiment of the principles of my invention.

Fig. 2 is an enlarged detail view, partly sectioned and partly diagrammatic, showing one form of device for maintaining the fore and aft axis horizontal.

Fig. 3 is an elevation of a control gyroscope which may be substituted for the pendulous gyroscope illustrated in Fig. 2.

Fig. 4 is an elevation of a pendulum which may be substituted for the pendulous gyroscope of Fig. 2.

Fig. 5 is a view of a self-damping gyroscope which may be substituted for the gyroscope of Fig. 2.

Fig. 6 is a vertical section through a circuit-controlling device.

Figs. 7, 8 and 9 are views similar to Fig. 2, but each showing a different modified form of apparatus for maintaining the horizontality of the platform along a fore and aft axis.

Fig. 10 is an end view of the vessel and platform as shown in Fig. 1, the hull of the vessel being shown merely in outline.

Figs. 11, 12 and 13 are views similar to Fig. 10 of the ship and platform of Figs. 7, 9 and 8, respectively.

Fig. 14 is a section through one of the platform-supporting bearings.

Referring to Fig. 1, there is shown a ship 10 upon which is mounted an aircraft platform indicated generally at 11, for facilitating launching and landing of aircraft. The ship is, of course, liable to rolling and pitching. Considering first the rolling movements of the vessel, the latter may be stabilized against rolling, as by means of a Sperry gyroscopic stabilizer, in which case the platform would be mounted to roll integrally with the ship and in this manner would be indirectly stabilized against rolling. If the ship is not stabilized against rolling, the platform could be mounted for rolling movement relative to the ship and a stabilizer applied directly to the platform, so that regardless of movements of the vessel, the platform would be stabilized against rolling. In Fig. 1 the ship is shown as stabilized against rolling by a Sperry stabilizer 12. The platform is therefore mounted on brackets 13 fixed to the vessel, so that the axis of suspension 14 is athwartships and the platform will partake of any rolling movements of the vessel. The latter being stabilized against rolling movements, the platform will be similarly stabilized.

While the stabilizer 12 counteracts rolling due to suddenly impressed forces, it does not prevent the ship from listing to one side or the other due to some continuously impressed force such as wind, unequal loading, etc., thus causing a similar list of the platform. To prevent such listing there may be provided the device shown in Fig. 10. A tank, or series of tanks, 15 is mounted adjacent each side of the ship and connected by pipes 16 with a reservoir and pump indicated generally at 17, the pump being operated by a motor 18 in one direction or the other to pump fluid into one or the other of tanks 15. The motor is operated in such direction as to cause fluid to be pumped into the tank 15 on the higher side of the vessel to bring the ship back to a position where its athwartship axis is horizontal. For controlling the motor 18 there is provided a circuit-closer 20 having surfaces 21 inclined slightly upwardly from the midway point to form a runway for a conducting ball 22 and having spaced contacts 23 at the ends of said runway, said contacts being wired into connection with the motor. It will be apparent that lateral inclination of the vessel beyond a predetermined degree depending upon the inclination of surfaces 21 will cause ball 22 to close the space between one or the other sets of contacts 23 to operate the motor in the proper direction. The wiring is such that when the ball engages the left hand contacts 23 the motor is operated to pump fluid into the right-hand tank or tanks 15, and vice versa. It is thus apparent that the ship, and hence the platform, is stabilized against rolling due to suddenly impressed forces and against listing due to continuously impressed forces.

To prevent oscillation of the platform about its fore-and-aft or longitudinal axis when the ship pitches, the axis 14 of the platform is not rigidly supported in bearings 13 but is pivotally mounted therein by means of an anti-friction bearing. Such bearing may take the form shown in Fig. 14 which shows the reduced platform journals 25 supported upon cylindrical bearings 26 within brackets 13. The platform may be substantially balanced fore and aft of the axis 14. As soon as the longitudinal axis of the platform deviates from the horizontal, i. e., upon incipient pitching, there is actuated means for applying a force, equal and opposite to the force tending to produce pitching, which will maintain the horizontality of said longitudinal axis. This means may take the form of any of the devices illustrated in Figs. 2, 7, 8 and 9, in all of which the fundamental principle is the same, i. e., the setting up of counteracting forces upon incipient deviation of the longitudinal axis of the platform from the horizontal position for maintaining said axis horizontal.

Referring to the form shown in Fig. 2, a gyroscope 30 is supported beneath the platform by brackets 31 fixed to said platform. The gyroscopic rotor is supported in a casing which is pivotally mounted in a ring 32, which is in turn pivotally mounted in the brackets 31, so that the gyroscope has three degrees of freedom and acts similar to a pendulum. A contact arm 35 carried by the gyroscope will therefore remain vertical regardless of the movements of the platform about axis 14, while contacts 36, 37, carried by the platform are positioned adjacent said contact arm so that one or the other of said contacts will engage the contact arm upon tilting of the platform to a slight degree about axis 14. The engagement of contact arm 35 with contact 36 or 37 will actuate relay 38 or 39, respectively, to close a circuit through a motor 40 to cause the latter to operate in one direction or the other. The motor is adapted to operate a reciprocating member 50, pivotally connected to the lower portion of the platform as at 49, through any suitable gearing such as pinion 41 fixed to the motor shaft, meshing with gear 42 mounted upon the same shaft as a worm 43 which meshes with a worm-wheel 44; the latter is provided with a hub which is internally threaded and has engagement with a threaded portion of reciprocating member 50. It will be apparent that rotation of motor 40 in one direction or the other will cause member 50 to be operated upwardly or downwardly, and since member 50 is off-set some distance from axis 14, it will operate to raise or lower the end (here shown as the forward end) of the platform to which it is attached and correspondingly lower or raise the other end. The circuits are so arranged that when the forward end of the platform starts to tilt upwardly so that contact 36 engages contact arm 35, the motor is rotated in a direction to lower the reciprocating member 50 and thus lower the forward end of the platform in opposition to the force tending to raise said end. The reverse connections will be made when the forward end of the platform starts to tilt downwardly and causes contact 37 to engage contact arm 35. In every case as soon as the longitudinal axis of the platform attains the horizontal position, the circuit through motor 40 will be broken. The contacts 36 and 37 are placed in such close proximity to the contact arm 35 that the motor 40 will be set in operation upon incipient deviation of the longitudinal axis of the platform from the horizontal position.

It will be observed that in the Fig. 2 device the platform is connected through reciprocating member 50 to the ship so as to partake of the pitching movements thereof. The landing of an aircraft or other forces acting to one side or the other of axis 14 will not cause pitching of the platform.

In place of the pendulous gyroscope 30 there may be provided a control gyroscope 51 comprising a casing pivotally mounted in bearings 52 about an axis 53. Said axis is positioned fore and aft of the ship, so that the contact arm carried by the gyroscope will in this case swing to the right or left upon precession of the gyroscope when the platform tilts longitudinally. In many respects the control gyroscope is to be preferred to the pendulous gyroscope, in that it is unaffected by acceleration pressures due to turning, starting and stopping of the vessel.

Another substitute for the pendulous gyroscope 30 may be provided in the form of a pendulum 55 pivotally suspended from the platform to swing longitudinally thereof. The pendulum may be provided with a contact ring 56, or a plurality of contacts in place of contact arm 35, for cooperation with contacts 36 and 37.

In Fig. 5 there is illustrated still another form of circuit-controller. This form is similar to that of Fig. 2 in that it comprises a pendulous gyroscope 60 having three degrees of freedom. The gyroscope is of the self-damping variety, being for this purpose provided with a plurality of outlets 61 in the casing 62. Within the casing operates a pendulum (not shown) which normally uncovers all of the outlets to the same degree to permit the same quantity of air to be expelled therethrough by a fan (not shown) within the casing. When, however, the gyroscope is tilted, due to various acceleration pressures, the pendulum uncovers certain of said openings more than others, permitting more air to pass through said first-named openings, thus setting up a greater reaction at said openings which tends to restore the gyroscope rapidly to vertical position. The gyroscope is thus self-damping and tends to minimize the effects of turning, starting, stopping and other acceleration movements. For a more complete disclosure of the self-damping gyroscope, reference should be had to Patent No. 1,324,482 to M. M. Titterington, granted Dec. 9, 1919. The gyroscope is pivotally mounted in brackets 57 fixed to the platform. To said brackets may be fixed circular, separated contacts 58 over which operates a trolley 59 carried by the gyroscope. Any incipient pitching of the platform will cause relative movement of the trolley and one of the contacts, depending upon the direction of the applied force. The circuit-closer 58, 59 may operate any mechanism, such as that described in connection with circuit-closer 20, for controlling the movements of the platform.

In Fig. 2 there is illustrated one form of apparatus for automatically applying a force to the platform equal and opposite to the forces tending to produce pitching, said apparatus including the motor 40, the gearing operated therefrom, and the plunger 50. In Fig. 7 there is shown a modified form of apparatus for accomplishing this purpose. Instead of a plunger 50 there are hingedly connected to the platform, pistons 61 and 62, one forward and one aft of the axis of oscillation 63 of the platform, and operating in cylinders 64, 65. Said cylinders form part of a fluid system comprising a supply pipe 67, a reservoir 68, a pump 69 operated by a motor 70 to maintain a predetermined pressure in the system, said pump communicating through a check-valve 72 to cylinder 64, conduit 73, and cylinder 65. Connected into conduit 73 is a by-pass which includes a pump 75 operated by a motor 76 connected to the circuit-closer 20. The pump is provided with two outlets 77, 78, controlled by valves 79, 80, one of said outlets opening into conduit 73 on one side of a valve 87 in said conduit and the other of said outlets opening into conduit 73 on the other side of valve 81. By closing valve 81 and operating the pump, fluid will be forced into cylinder 64 or cylinder 65, depending upon which of the valves 79, 80 is open, to force the respective piston upwardly. Means are provided whereby fluid is forced into the cylinder on that side of the platform which it is desired to elevate. For this purpose there may be provided two electromagnets 82 and 83 wired into connection with a circuit-closer which may be of the type shown in Fig. 6, so that magnet 82 will be energized when the ball 72 closes the left hand (in Fig. 7) contacts 23, and magnet 83 will be energized when the right-hand contacts are closed. The energized magnet attracts one arm 85 of a T-lever whose other arms 86 are pivoted to links 87 connected to valves 79 and 80, said T-lever being pivoted at 90, so that one link 87 is raised to open the respective valve and the other link 87 is lowered to close the respective valve every time arm 85 is attracted by one or the other of the magnets. The pivot 90 of arm 85 is fixedly connected to the valve 81, and said valve is constructed so that it is in open position whenever arm 85 is in centralized position between the magnets, and is closed whenever arm 85 is attracted by either of said magnets. Closing of valve 81 permits fluid to be pumped through the open valve 79 or 80 to the respective cylinder 64 or 65. Springs 107 may be employed for centralizing arm 85 between magnets 82 and 83.

The operation of the device shown in Fig. 7 is as follows: Assume the rear end of the platform starts to descend under some force. Ball 22 closes the left-hand contacts 23 to energize magnet 82 to attract arm 85 and open valve 79 and close valve 80. As the magnet 82 is energized valve 81 is closed and motor 76 is started to operate the pump. Valve 79 being open, fluid will be pumped into cylinder 64 to raise piston 61 and counteract the forces tending to lower the rear end of the platform. When ball 22 closes the right-hand (forward) contacts, due to forces tending to lower the forward end of the platform, magnet 83 is energized to close valve 79 and open valve 80 to pump liquid into cylinder 65 and raise piston 62. A pressure-gauge 88 is provided which may have limit contacts to stop pump 69 when a predetermined pressure has been attained in the system.

In the Fig. 7 modification it will be observed that there is no fast connection between the ship and the platform as in the Fig. 2 device, and since the platform is substantially balanced fore and aft of axis 14 on frictionless bearings, its great weight and consequent inertia will prevent it from pitching with the ship. The platform being pivotally mounted and balanced about axis 63, it is apparent that the positioning of any weight upon said platform fore or aft of said axis would ordinarily result in rotating the platform and destroying the horizontality of its longitudinal axis. This would occur whenever an aircraft landed, or was otherwise positioned, upon the platform in any but an exactly balanced position relative to axis 63, or whenever it became necessary for mechanics or other persons to mount upon the platform. The platform may partake to a slight extent of the pitching movements of the ship due to slight friction in the bearings, but whether pitching of the platform is induced by some balance-destroying force or by pitching to a slight extent with the ship, the device of Fig. 7 will be effective to oppose such pitching movements.

Another modified form of apparatus for automatically applying a force to the platform which opposes pitching is shown in Fig. 8. In this form, the same type of circuit-closer 20 may be employed to render one of two motors 98, 99 effective, depending upon the direction in which the platform tends to pitch. Each motor shaft is connected to a reel 100, 101, around which operates a cable 102, 103, the other end of the cables being connected to the rear and forward portions of the platform, respectively. The reels are normally operated by coil springs 104, 105 to take up slack in the cables.

The operation of the Fig. 8 device is as follows: When a force is applied to the rear end of the platform tending to force it downwardly from the horizontal position, the motor 99 is energized to wind up cable 103, thus forcing the rear end of the platform upwardly and the forward end downwardly. Cable 102 unwinds against the action of spring 104. When a force is applied tending to move the forward end of the platform downwardly from the horizontal position, the motor 98 is energized.

Still another modified form of apparatus for automatically applying a force to the platform to oppose pitching thereof is shown in Fig. 9. In this modification the circuit-closer 20 controls a reversible motor 110 which is connected by any suitable gearing 111, 112, 113 to a sector 114 fixed to the platform. It will be understood that the motor is so connected to the circuit-closer that the former will operate the platform in a direction to oppose tilting of the latter, as will be obvious. A brake 115 of a well-known type may be incorporated for quickly stopping the motor.

The platform comprises a flat-top landing or launching surface 120 (see Fig. 7) supported by a truss-structure 121 beneath it, and having side-brackets 122 depending from said platform. The platform is pivoted by means of said brackets 122 and pivots 63 in the brackets 13 fixed to the ship. The brackets 122 may be of any desired length, according to the position of the pivotal axis of the platform. In Figs. 1 and 10 it will be observed that the platform is decidedly pendulous, the pivotal axis 14 being located just below the flat-top 120. This form is self-damping in that the pendulum exercises a restoring effect in opposition to forces tending to destroy the horizontality of the platform and is, therefore, not very sensitive. In Figs. 7, 9 and 11, the pivots 63 are placed some distance below the top 120 of the platform so that the latter is top-heavy and unstable, and hence, highly sensitive to pitching movements. In Figs. 8 and 13 the pivots 130 are positioned still further below the top of the platform, the pivotal axis being substantially at the water-line. In this construction the platform is most readily responsive to pitching movements, but is least affected by the pitching of the ship, since the axis of pivots 130 coincides substantially with the axis of pitching of the vessel.

The platform being of considerable length, it may be desirable to guide it in its movements relative to the ship. For this purpose the platform may be provided with a substantially vertical bar 131 having engagement with ball-bearings 133 operating in a guide block 132 fixed to the ship (see Figs. 9 and 12). Said guide-members may be provided at each side of the platform and forward and aft of the pivotal axis of the platform. While shown in connection with Fig. 9, it will be understood that the guides may be applied to any of the platforms shown.

When not in use, the platform may be supported at each end by supporting bars 135 pivoted to the deck of the vessel at 136 so that they may be swung downwardly to ineffective positions when the platform is to be used for landing or launching purposes.

Ships are stabilized usually against rolling and hence the platform is stabilized against pitching. It will be understood, however, as hereinbefore stated, that the platform itself may be stabilized against both rolling and pitching; also, where a ship is stabilized against pitching, the devices hereinbefore described may be utilized to stabilize the platform against rolling by merely causing them to operate in a plane turned through 90° from their described positions.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combinations and relations described, some of these may be altered and others omitted without interfering with the more general results outlined, and the invention extends to such use.

Having herein described my invention, what I claim and desire to secure by Letters Patent is, 1. The combination of a ship stabilized against rolling and a platform mounted on the ship and stabilized against pitching.

2. An aircraft landing platform adapted to be mounted on a ship, and means for preventing transmission to said platform of the pitching movements of the ship.

3. In combination with a ship, an aircraft platform adapted to be mounted thereon, means for stabilizing said platform against rolling, and means for preventing transmission to said platform of the pitching movements of the ship.

4. In combination with a ship, a platform adapted to be mounted thereon, means for stabilizing the ship against oscillatory movements in one direction, and means for stabilizing said platform against oscillatory movements in a direction substantially at right angles to said first-named direction.

5. In combination, a platform mounted on a ship for rolling movement therewith, means for stabilizing the ship against rolling, and means for stabilizing the platform against pitching.

6. An aircraft platform adapted to be mounted on a ship, means for stabilizing the platform against rolling, and means rendered effective by pitching of the platform to counteract forces tending to produce pitching of said platform.

7. An aircraft platform adapted to be mounted on a ship, means for stabilizing the platform against lateral oscillations, and means for stabilizing the platform against longitudinal oscillations.

8. An aircraft platform adapted to be mounted on a ship for rolling movement therewith, means for stabilizing the ship against lateral oscillations, and means for stabilizing the platform against longitudinal oscillations.

9. An aircraft platform adapted to be mounted on a ship for rolling movement therewith, means for stabilizing the ship against lateral oscillations, and means rendered effective by pitching of the platform for stabilizing the platform against longitudinal oscillations.

10. In combination an aircraft platform adapted to be mounted on a ship for rolling movement therewith, means for stabilizing the ship against rolling, and means for maintaining the longitudinal axis of said platform horizontal.

11. In combination, a ship, a platform, anti-friction bearings carried by said ship and in which said platform is supported, said platform being balanced fore and aft of said bearings so as not to partake of the pitching movements of said ship.

12. In combination, a ship, an aircraft platform mounted on said ship, electrically-controlled means for maintaining the fore-and-aft axis of said platform horizontal, and means responsive to pitching of said platform for actuating said first named means.

13. In combination, a ship, an aircraft platform mounted on said ship for rolling movement therewith, means for counteracting rolling movements due to intermittently impressed forces, and means for counteracting tendency of the ship to list due to continuously impressed forces.

14. In combination, an aircraft platform adapted to be mounted on a ship, means for stabilizing the platform against rolling movements due to intermittently impressed forces, and means for counteracting tendency of the platform to list due to continuously-impressed forces.

15. In combination, a ship, an aircraft platform mounted on said ship for rolling movement therewith, means for stabilizing the ship against rolling movements due to intermittently-impressed forces, and means rendered effective by listing of the vessel due to continuously-impressed forces for counteracting tendency of the ship to list.

16. In combination, an aircraft platform adapted to be pivotally mounted on a ship, said platform being normally balanced about its pivots, and means for automatically applying a force to said platform equal and opposite to any force tending to destroy the balance.

17. In combination, an aircraft platform adapted to be pivotally mounted on a ship, said platform being normally balanced about its pivots, and means rendered effective by the application of a force to said platform which tends to destroy the balance for automatically applying a force to said platform equal and opposite to said balance-destroying force.

18. In combination with a ship, an aircraft platform adapted to be oscillatably mounted thereon on an athwartship axis, means rendered effective by deviation from the horizontal of the fore-and-aft axis of said platform for maintaining said last named axis horizontal, said means comprising a motor and a connection between said motor and said platform whereby said motor applies a force to said platform to oppose the forces tending to produce deviation of said fore-and-aft axis from the horizontal.

19. In combination, a ship, an aircraft platform adapted to be mounted thereon, means for maintaining the fore-and-aft axis of said platform horizontal, and means whereby said first-named means is rendered effective upon deviation of said axis from the horizontal and rendered ineffective when said axis assumes the horizontal position.

20. In combination with a ship, an aircraft platform adapted to be mounted thereon, means rendered effective by deviation from the horizontal position of the longitudinal axis of said platform for applying a force to that end of said platform which is below the horizontal position thereof to force said end upwardly.

21. In combination with a ship, an aircraft platform adapted to be mounted thereon, means rendered effective by deviation from the horizontal position of the longitudinal axis of said platform for applying a force to that end of said platform which is below the horizontal position thereof to force said end upwardly, and means for rendering said first-named means ineffective when said end reaches the horizontal position.

22. In combination with a ship, an aircraft platform adapted to be mounted thereon, a plurality of motors mounted on said ship, each end of said platform being operatively connected to one of said motors, and means whereby said motors are rendered effective by pitching of said platform to maintain the platform in horizontal position.

23. In combination with a ship, an aircraft platform adapted to be mounted thereon, a plurality of motors mounted on said ship, each end of said platform being operatively connected to one of said motors, and means whereby pitching of said platform renders effective the motor connected to that end of said platform which is above the horizontal position to restore said end to horizontal position.

24. In combination with a ship, an aircraft platform adapted to be mounted thereon, a plurality of motors mounted on said ship, a cable connection between each end of said platform and one of said motors, and means whereby pitching of said platform renders effective the motor connected to that end of said platform which is above the horizontal position to wind up the respective cable and restore said end to horizontal position.

25. In combination with a ship, an aircraft platform adapted to be mounted thereon, a plurality of motors mounted on said ship, a winding-drum connected to each of said motors, a cable connection between each end of said platform and one of said drums, means whereby pitching of said platform renders effective the motor connected to that end of said platform which is above the horizontal position to wind up the respective cable and restore said end to horizontal position, and means connected to said drums for taking up slack in said cables.

26. In combination with a ship, an aircraft platform adapted to be pivotally mounted thereon, and means rendered effective by rotation of said platform away from the horizontal position for rotating said platform to maintain the latter in horizontal position.

27. In combination with a ship, an aircraft platform adapted to be pivotally mounted thereon, a reversible motor mounted on said ship, gearing connections between said motor and said platform, a circuit-closer for controlling said motor, said circuit-closer being actuated upon deviation of said platform from the horizontal position to render said motor effective in a direction to maintain the horizontality of the platform.

28. In combination with a ship, an aircraft platform and means for pivotally mounting said platform thereon so that the pivotal axis of said platform is below the center of gravity thereof.

29. In combination with a ship, an aircraft platform and means for pivotally mounting said platform thereon so that the pivotal axis of said platform is below the center of gravity thereof and substantially coincident with the axis of pitching oscillations of said ship.

30. In combination with a ship, an aircraft platform, means for pivotally mounting said platform thereon for movement relative thereto, and additional means for guiding said platform in its movements relative to said ship.

31. In combination with a ship, an aircraft platform adapted to be pivotally mounted thereon for movement relative thereto, and means for guiding said platform in its movements relative to said ship, said means comprising guide members fixed to said ship, and anti-friction rollers between said guides and said platform.

32. In combination, a ship, a platform, means for balancing the platform on an athwartship axis, means for preventing said platform from tipping about said axis, and means brought into action by pitching of the ship for preventing said second-named means from causing said platform to pitch with the ship.

33. In combination, a ship, an air-craft platform, means for pivotally mounting said platform so that the pivotal axis of the same is substantially in a vertical line with but below the center of gravity of the platform.

In testimony whereof I have affixed my signature.

ALEXANDER E. SCHEIN.